United States Patent
Rubin et al.

(10) Patent No.: US 9,449,515 B2
(45) Date of Patent: Sep. 20, 2016

(54) V2V SAFETY SYSTEM USING VEHICLE LOCATION AS VEHICLE IDENTIFICATION

(71) Applicant: Zetta Research and Development, LLC—ForC Series, Wilmington, DE (US)

(72) Inventors: Kim Rubin, Menlo Park, CA (US); Joe Betts-Lacroix, Belmont, CA (US)

(73) Assignee: ZETTA RESEARCH AND DEVELOPMENT, LLC FORC SERIES, Wilmington, DE (US)

( * ) Notice: Subject to any disclaimer, the term of this patent is extended or adjusted under 35 U.S.C. 154(b) by 0 days.

(21) Appl. No.: 14/395,760

(22) PCT Filed: Apr. 24, 2013

(86) PCT No.: PCT/US2013/037925
§ 371 (c)(1),
(2) Date: Oct. 20, 2014

(87) PCT Pub. No.: WO2013/163265
PCT Pub. Date: Oct. 31, 2013

(65) Prior Publication Data
US 2015/0081201 A1    Mar. 19, 2015

Related U.S. Application Data

(60) Provisional application No. 61/637,588, filed on Apr. 24, 2012.

(51) Int. Cl.
*G08G 9/02* (2006.01)
*G08G 1/0967* (2006.01)
(Continued)

(52) U.S. Cl.
CPC ......... *G08G 1/096791* (2013.01); *G01C 21/26* (2013.01); *G01C 21/3658* (2013.01); *G08G 1/09* (2013.01); *G08G 1/0969* (2013.01); *G08G 1/142* (2013.01); *G08G 1/16* (2013.01); *G08G 1/161* (2013.01); *G08G 1/163* (2013.01);
(Continued)

(58) Field of Classification Search
CPC ................. G08G 9/02; G08G 1/0133; G08G 1/096716; G08G 1/0112; G08G 1/22; G08G 1/166; H04W 72/005; H04W 40/248; H04J 3/1694
USPC .................. 701/24, 29.1, 117, 301; 340/905; 370/312, 315, 347
See application file for complete search history.

(56) References Cited

U.S. PATENT DOCUMENTS

2010/0256852 A1 * 10/2010 Mudalige ................. G08G 1/22
701/24
2012/0253646 A1 * 10/2012 Reghunath ........... G08G 1/0112
701/117
(Continued)

*Primary Examiner* — Yuri Kan
(74) *Attorney, Agent, or Firm* — Kim Rubin, Patent Agent

(57) ABSTRACT

A vehicle-to-vehicle (V2V) communication transponder for use in V2V communication, safety and anti-collision systems using only a vehicle location for vehicle ID is described. Message embodiments are free of pre-assigned permanent vehicle identification. A hybrid TMDA and CSMA protocol is used. Vehicle position is broadcast as an offset in distance units from a pre-defined geographical grid in degree units. A transponder may proxy for non-equipped vehicle. A proxy handoff and message coding for a proxy message are described. Embodiments are free of MAC and IP addresses. No central authority or road-side equipment (RSU) is required. Embodiments include equipped vehicles and V2V system using the transponder. Embodiments include equipped vehicles and V2V system using the transponder.

20 Claims, 8 Drawing Sheets

(51) Int. Cl.

| | | |
|---|---|---|
| *G08G 1/09* | (2006.01) | |
| *G08G 1/14* | (2006.01) | |
| *G08G 1/16* | (2006.01) | |
| *H04W 4/04* | (2009.01) | |
| *H04W 4/06* | (2009.01) | |
| *G01C 21/26* | (2006.01) | |
| *G01C 21/36* | (2006.01) | |
| *G08G 1/0969* | (2006.01) | |
| *H04J 3/16* | (2006.01) | |
| *H04L 5/00* | (2006.01) | |
| *H04W 72/04* | (2009.01) | |
| *H04W 74/08* | (2009.01) | |
| *H04W 72/00* | (2009.01) | |
| *H04W 64/00* | (2009.01) | |
| *H04W 76/00* | (2009.01) | |
| *H04W 76/02* | (2009.01) | |
| *B60R 25/33* | (2013.01) | |
| *G01S 5/00* | (2006.01) | |
| *G08G 1/00* | (2006.01) | |
| *B60W 10/06* | (2006.01) | |
| *B60W 10/18* | (2012.01) | |
| *B60W 10/20* | (2006.01) | |
| *B60W 50/14* | (2012.01) | |

(52) U.S. Cl.
CPC ............ *G08G 1/166* (2013.01); *G08G 1/167* (2013.01); *G08G 9/02* (2013.01); *H04J 3/1694* (2013.01); *H04L 5/0091* (2013.01); *H04W 4/046* (2013.01); *H04W 4/06* (2013.01); *H04W 72/005* (2013.01); *H04W 72/0446* (2013.01); *H04W 74/0816* (2013.01); *B60R 25/33* (2013.01); *B60R 2325/205* (2013.01); *B60W 10/06* (2013.01); *B60W 10/18* (2013.01); *B60W 10/20* (2013.01); *B60W 50/14* (2013.01); *B60W 2550/402* (2013.01); *G01S 5/0027* (2013.01); *G08G 1/20* (2013.01); *H04W 64/006* (2013.01); *H04W 76/002* (2013.01); *H04W 76/023* (2013.01)

(56) References Cited

U.S. PATENT DOCUMENTS

| | | | | |
|---|---|---|---|---|
| 2012/0303203 | A1* | 11/2012 | Olsen | G08G 1/0133 701/29.1 |
| 2013/0154853 | A1* | 6/2013 | Chen | G08G 1/096716 340/905 |
| 2013/0279392 | A1* | 10/2013 | Rubin | H04W 72/005 370/312 |
| 2013/0279393 | A1* | 10/2013 | Rubin | H04J 3/1694 370/312 |
| 2013/0279491 | A1* | 10/2013 | Rubin | G08G 1/166 370/347 |
| 2015/0092661 | A1* | 4/2015 | Huang | H04W 40/248 370/315 |

* cited by examiner

Fig. 8

| 110 | 111 | 112 Time Slot | 113 | 114 |
|---|---|---|---|---|
| Vehicle No. | Proxy | | Status | Risk |
| 121 | - | 42 | dormant | n/a |
| 122 | - | 11 | active | low |
| 123 | Yes | 3 | active | low |
| 126 | - | 50 | new | low |

| 110 | 115 Last Transmitted | | 116 117 | | 118 | 119 | 120 Next | | 121 122 |
|---|---|---|---|---|---|---|---|---|---|
| Vehicle No. | Location | Time | Speed | Heading | Acceleration | Location | Time | Error - meters |
| 121 | N-S / E-W | 14:29:8.0 | 12.1 m/s | 44.5° | n/a | n/a | n/a | n/a |
| 122 | N-S / E-W | 14:31:12.2 | 13.6 m/s | 166.1° | vector 122 | N-S / E-W | 14:31:12.3 | 91.6 |
| 123 | N-S / E-W | 14:31:12.2 | 4.1 m/s | 164.3° | vector 123 | N-S / E-W | 14:31:12.3 | 7.13 |
| 126 | N-S / E-W | 14:31:12.2 | 13.9 m/s | 164.3° | unknown | N-S / E-W | 14:31:12.3 | 0.06 |

V2V SAFETY SYSTEM USING VEHICLE LOCATION AS VEHICLE IDENTIFICATION

TECHNICAL FIELD

The technical field of this invention is vehicle-to-vehicle (V2V) communication, safety, and anti-collision systems.

BACKGROUND ART

Background art includes wireless communications protocols, including IEEE 802.11, using CSMA and wireless systems using TDMA, such as the Automatic Identification System (AIS). Some systems require a central authority, hierarchical architecture or road-side equipment (RSU). Some systems are completely self-configuring or "ad hoc." Nearly all prior art intended for V2V use includes permanent vehicle identification, and nearly all use IP address and MAC addresses. Background art suffers from: (i) insufficient bandwidth to handle the necessary number of vehicle in a V2V system, (ii) incomplete specifications such that enablement does not exist, (iii) non-real time operation which fundamentally fails to provide the purpose of a V2V anti-collision system, which is to prevent collisions, (iv) inconsistent or unreliable performance, and (v) a design which requires 90% of vehicles to be equipped for reasonable system-level performance.

Background patents and patent applications include:
US 2012/0028862, published Feb. 2, 2012, by Nagai, Makoto, et al.;
U.S. Pat. No. 7,979,198-B1, published Jul. 12, 2011, by Kim et al.;
U.S. Pat. No. 7,236,878-B2, published Mar. 24, 2005, by Watanabe, Hisauyuki;
U.S. Pat. No. 5,506,587-A, published Feb. 21, 1993, by LANS, HÅKAN;
U.S. Pat. No. 3,660,404, published Feb. 23, 1971, by Sorkin;
U.S. Pat. No. 6,765,495-B1, published Jul. 20, 2004, by Dunning, et al.;
US 2005/0886318A1, published Apr. 28, 2005, by Liu, Jie;
US 2012/0268295A1, published Oct. 25, 2012, by Yuse, Yoshio;
U.S. Pat. No. 7,840,331, published May 8, 2008, by Yoshioka, Mototaka;
US 2012/0120883, published May 17, 2012, by Chen, Chung-Min, et al.;
US 2008/0095163-A1, published Apr. 24, 2008, by Wai Chen, et al.

Non-patent background literature includes:
FELIX SCHMIDT-EISENLOHR; Interference in Vehicle-to-Vehicle Communication Networks; Feb. 9, 2010; KIT Scientific Publishing; Karlsruhe, Germany; FIGS. 6.3 & 6.6; KARAGIANNIS, GEORGIOS; Vehicular Networking: A Survey and Tutorial, Feb. 11, 2010; IEEE Communications Surveys;
ON THE ABILITY OF IEEE 802.11P AND STDMA TO PROVIDE PREDICTABLE CHANNEL ACCESS; Bilstrup, Katrin, et al. 2009; Centre for Research on Embedded Systems, Lamstad University, Sweden;
TECHNICAL CHARACTERISTICS AUTOMATIC IDENTIFICATION SYSTEM MARITIME; Intl Telecom Union; 04-2010; Recommendation ITU-R M.1271-4; Geneva.

Priority is claimed to:
U.S. application Ser. No. 13,852,200, filed 28 Mar. 2013, with priority to U.S. application Ser. No. 13,557,711 filed 25 Jul. 2012, with priority to U.S. Provisional Appl. No. 61,637,588, filed 24 Apr. 2012;
U.S. application Ser. No. 13,852,176, filed 28 Mar. 2013, with priority to U.S. application Ser. No. 13,557,711 filed 25 Jul. 2012, with priority to U.S. Provisional Appl. No. 61,637,588, filed 24 Apr. 2012;
U.S. application Ser. No. 13,852,153, filed 28 Mar. 2013, with priority to U.S. application Ser. No. 13,557,711 filed 25 Jul. 2012, with priority to U.S. Provisional Appl. No. 61,637,588, filed 24 Apr. 2012;
U.S. application Ser. No. 13,633,657, filed 2 Oct. 2012, with priority to U.S. Provisional Appl. No. 61,637,588, filed 24 Apr. 2012;
U.S. application Ser. No. 13,557,711 filed 25 Jul. 2012, with priority to U.S. Provisional Appl. No. 61,637,588, filed 24 Apr. 2012; and
U.S. application Ser. No. 13,556,123, filed 23 Jul. 2012, with priority to U.S. Provisional Appl. No. 61,637,588, filed 24 Apr. 2012; and
U.S. Provisional Appl. No. 61,637,588, filed 24 Apr. 2012.

DISCLOSURE OF THE INVENTION

In various embodiments, this invention is a comprehensive, usable system that will actually function in a real-world V2V environment by overcoming the above-stated weaknesses of the prior art. A non-limiting scenario is described below.

A key embodiment of this invention uses very short messages so that there is sufficient bandwidth for a functional V2V system, which may have as many as 250 vehicles needing to communicate simultaneously within range. Messages are kept short by not using MAC and IP addresses, by using TDMA protocol with minimal inter-message guard times, by sending highly compact core vehicle data including position, heading and speed, and by using vehicle's position as the only or primary method to identify a vehicle in real-time. Since the position must be sent as core data anyway, eliminating an unnecessary pre-assigned permanent vehicle ID saves precious bandwidth.

Some vehicles are equipped with a transponder ("equipped vehicle"), some are not ("non-equipped vehicles.") Each second is divided into TDMA frames for 100 ms; each TDMA frame is divided into 1000, 100 µs time slots. The frames, or "basic time intervals," are subdivided into three dynamically-sized "class regions," a first class region, "priority," which starts at time slot 1, a second class region, "non-priority", and a third class region, "emergency" ending at time slot 1000. The priority and emergency class regions are similar, handling time-critical messages only, using TDMA protocol. The priority class region is for most vehicles, with the emergency class region reserved for emergency vehicles and government authorized road-size equipment (RSU). The priority class expands and contracts upward starting at time slot 1. The emergency class expands and contracts downward, starting at time slot 1000. The non-emergency class is all left over time slots, not in the other two class regions or in a buffer zone. The non-priority class region is managed in a modified CSMA protocol; it handles longer messages and non-time-critical messages. The CSMA protocol is modified because messages may not overlap into the priority and emergency class regions, and messages broken into multiple frames are preferentially transmitted starting at the same time slot in each frame. Different priorities within the non-priority class region may use different back-off times an other different parameters based on the message priority.

We discuss the priority class region. Protocol for the emergency class region is similar, except for the above stated restrictions, and different parameters.

Priority class messages are nearly all fixed length, the length being one time-slot. Messages with more data are encoded using a higher-density modulation. A transponder self-selects a time slot, then keeps that same time slot until a reselection condition occurs. The transponder transmits in its selected time slot in every frame, which "holds" that time slot so that another transceiver does not select it. A reselection condition is either (1) a message collision in that time slot, or (2) a time slot holding timer expires, combined with other conditions. When a transponder selects a new time slot it chooses, using a weighted random function, from the set of available time slots in its priority class.

All transponders participate in identifying message collisions—that is, two or more transponders transmitting in the same time slot within a communication range. Any transponder detection a message collision sends a message collision notification message, unless a similar message has already been sent.

The size of the priority class region is dynamic, changing each frame based on how busy that class region is. The size of the class region is the larger of (1) the highest numbered time slot in use in the region, or (2) a size set to keep the number of available time slots at or above a threshold. The weighted time slot selection functions causes selected time slots to statistically "clump" near 1, keeping the size of the priority class region as small as possible. The reselection time-out causes transponders with a high time slot number to eventually select a likely lower time slot number, keeping the priority class region as small as possible. One embodiment provides that there is always a minimum of 100 empty or available time slots in the priority class region, subject to the total available time slots in the frame.

Ideally, most of the time, the priority and emergency class regions are small, providing most of the time slots, and thus most of the available bandwidth, available in the non-priority class region for a wide variety of messages, including courtesy messages, data update messages (e.g., lane maps and lane history), and social messages. If necessary, the priority and emergency class regions will expand to consume the entire frame, permitting up to 1000 time-critical messages to be sent ten times per second.

A targeted range for an effective communication range is 1 km. A targeted number of vehicles in a range set is up to 250.

A basic V2V safety message transmitted in the priority class region comprises: (i) a vehicle position, (ii) the vehicle heading, and (iii) the vehicle speed. It may also comprise a vehicle type code. It may also comprise a collision risk value and a collision type. It may comprise sub-messages, wherein a wide variety of sub-messages are defined. It may include elevation. The vehicle of the message may either be the host (equipped with the transponder) vehicle or a (non-equipped) proxy vehicle The vehicle position, heading and speed are compressed in a novel format that uses few bits, keeping the messages size small, and thus permitting a highly reliable modulation. Vehicle position is sent as an offset from a nearby point on a predefined grid, such as every ½ degree of latitude and longitude. A predefined set of elevations, such as every 100 meters, is also used, wherein an offset from the nearest elevation in the set is used to communicate a particular elevation.

IP address, MAC addresses and pre-assigned vehicle identifiers are not generally used. Vehicles are tracked solely by their position (unless still or video images are used to link a vehicle location to license plate or other permanent identification). This dramatically reduces the size of messages. An occasional (sent every 1 to 5 seconds) "linking" message in the non-priority class region may be used to link the regular V2V safety messages to a pre-assigned permanent vehicle identification.

Nearly all priority messages are broadcast in clear text. PKI, encryption, and digital certificates may be used for messages in the non-priority class region. Vehicles may be identified either by: (1) their location, or (2) their time slot.

Because the communication range for priority messages is short, such as 1 km, the inter-frame gap may be short, such as 4 µs. Power is adjusted dynamically so that vehicles outside the range set do not interfere. The range, and the inter-frame gap, may be different for each of the three class regions. Thus, the emergency and non-priority class regions may have a significantly longer range.

A buffer zone of time slots may be used between the three class regions, such as 10 to 100 time slots, to enable rapid expansion of the priority and emergency class regions. The priority and emergency class regions may have a minimum size, such as 10 to 250 time slots.

A unique feature of embodiment is "proxying," whereby an equipped vehicle sends messages on behalf of a nearby non-equipped vehicle. A proxy hand-off is described. This embodiment permits effective operation a V2V anti-collision system with as little as 10% of all vehicles being equipped.

A unique feature of embodiments is that no central authority is required. A system of deployed transponders is entirely self-sufficient. No government or cloud-based entity is required; no RSU is required; no IP addressing is required; no IP address assignment source is required; and no certificate authority is required.

BRIEF DESCRIPTION OF DRAWINGS

FIG. 8 shows exemplary data base entries for tracking vehicles.

BEST MODE FOR CARRYING OUT THE INVENTION

Figure 1:
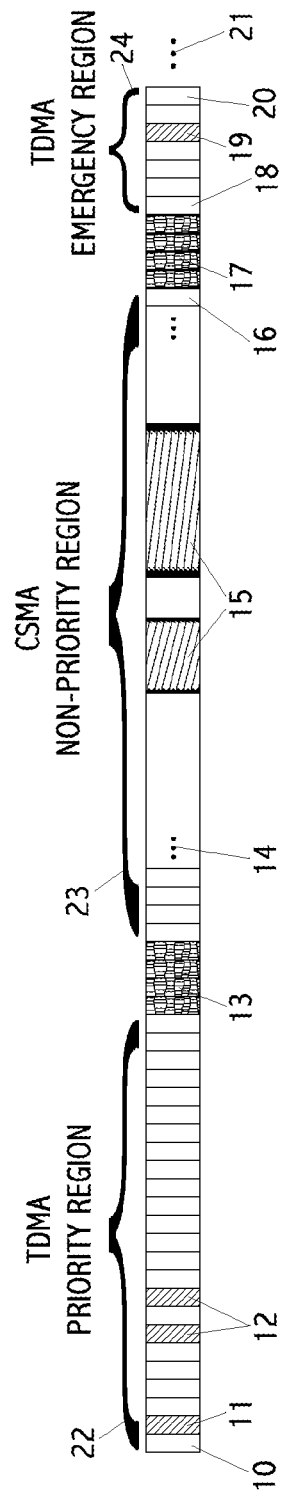
FIG. 1 shows one exemplary frame, time slots, and three class regions.

The essence of the V2V safety system is the regular broadcast, by all equipped vehicles of a vehicle "core data" time-critical, V2V safety message, comprising a vehicle's position, heading and speed, in a self-selected time slot in a repeating, fixed-time frame, or "basic time interval." The frame may be from 1 ms to 5000 ms; 100 ms is preferred. The number of time slots in a frame may be 10 to 10,000; 1000 time slots are preferred. Various wireless frequencies are possible, with government allocated frequencies for vehicle safety communications are preferred, such as are listed in IEEE 802.11p. Various modulations are possible, but the modulations as described in IEEE 802.11p are preferred.

The CSMA protocols of IEEE 802.11 are not effective for V2V safety applications. Thus, embodiments use a TDMA protocol, instead, with the TDMA frame divided into two or more class regions, as described above, with or without buffer regions between the class regions. One class region, the non-priority class region, uses a modified CSMA protocol to permit longer and non-time-critical messages, as compared to the priority and emergency class regions.

Fixed equipment, such as road-side unit (RSU) to vehicle communication is sometimes called X2V, or V2X. We use V2V to encompass all variations, including X2V, V2X, and defining cars, trucks, busses, trains, pedestrians, animals, moving sports equipment, construction equipment, fixed or temporary road hazards, government transponders, robots, automated vehicles and drones as "vehicles."

Collision prevention also includes collision mitigation and behavior modification that improves safety and safety margins, whether the vehicle behavior modification is automatic or human mediated.

A vehicle is "equipped" when it comprises a properly operating transponder sending valid V2V safety messages regarding a vehicle. An equipped vehicle may "proxy" for another, non-equipped vehicle, by sending data for the non-equipped vehicle on its behalf. In most case, "the vehicle" is either the equipped vehicle in which the transponder is located, or the non-equipped vehicle being proxied. Ideally, a single bit in the core safety message identifies if the message is a proxy message. A transponder may function as multiple transponders; for example, it may be sending messages for its host vehicles and two other, proxied vehicles; in this case, it acts as three separate transponders.

A transponder needs to know a vehicle's position, heading and speed. Typically, a mix of a global positing satellite receiver (such as GPS, or another system) and inertial navigation are used, often with other sensors or other data, to determine the "believed," "best computed" or baseline geographical position, heading, and speed. An electronic compass, magnetometer, accelerometer, motion sensor, or video inputs may be used. The actual transmitted position is compressed data, ideally an offset from a predetermined geographical grid. In addition, the transmitted position may be modified from the baseline position by a vector offset as part of "location consensus algorithm."

In one embodiment, a priority class region starts at frame 1 and grows upward based on demand; there may be a minimum size in the range of 10 to 500 time slots, such as 100 time slots. An emergency class regions starts at frame 1000 and grown downward based on demand; there may be a minimum size in the range of 10 to 100 time slots, such as 25 time slots. The emergency class region may be reserved for emergency vehicles, government authorized road-side equipment (RSU), or both. The priority class region is reserved for time-critical V2V safety messages; transponders should ideally self-select a single time slot in this class region and transmit a message in that time slot in every frame until a new time slot selection condition is met. However, a transponder occasionally not transmitting in a frame, or occasionally transmitting in a second time slot is still within the scope of claimed embodiments. Transponders should transmit in their selected time slot every frame, or at least in 50% of all frames.

Core data messages (position, heading and speed), message collision messages, network error or hacking detection notification, and risk warnings above a risk threshold are all time-critical V2V safety messages. Generally, a transponder will send core message data in every frame. It will supplement this core message data with additional data, either time-critical or not time critical, as the need to send those messages arises. It may, for a period of one frame at a time, substitute a non-core-data message for a core data message, using the same time slot. Thus, up to every other frame may be non-core-data messages.

Additional data, beyond the core data, may be transmitted in the time window of one time frame by increasing the modulation complexity. Modulation may be selected on a per-message basis. Thus, it may change every time slot, every frame, or from one class regions to another.

Demand within a class region may be measured by the number of transponders using the class region, the number of vehicles with representative data in the class region, the number of used time slots, or the number of empty time slots in the class region. These various metrics vary slightly, but are functionally equivalent. An ideal metric is the number of empty or non-empty time slots in the current class region. An empty time slot is one that was sufficiently free from other transmission or noise that it is suitable and available for selection by a transponder, for the immediately prior frame, or for n consecutive immediately prior frames, where n is in the range of 1 to 10. Good choices for n are 1 or 2.

In one embodiment the size of the priority class region resets at the end of each frame such that the number of empty time slots is a constant, such as 100, subject to a first limitation that a currently used time slot in class region, for example, time slot 163, restricts downsizing the class region to exclude the used time slot, and a second limitation that the priority class region may not grow into the emergency class region.

Similarly the emergency class region size resets at the end of each frame such that the number of empty time slots is a constant, such as 25, and the class region may not downsize such that it excludes a currently used time slot in the region. The emergency class region may expand to every time slot in the frame, if necessary.

The non-priority class region, which is managed with a modified CSMA protocol, consists of the "left over" times slots in the frame not in the priority or emergency class regions, or in any buffer zones. This class region supports a wide range of message times, message lengths, priorities, and modulations. It may have a different range, power, and inter-transmission guard time than the other class regions. Transmissions in this class region may not overlap with the priority and emergency class regions. They may overlap with a buffer zone for no more than one frame, and may not overlap with a buffer zone during the first transmission of a chained, or multi-part transmission. Differing priorities within this class region should use different parameters, such as different waiting times and different back-off periods. A multi-part transmission should start at the same time slot in each frame, even if the initial transmit time was selected using CSMA. A transponder may not begin transmitting in the non-priority class region until it first determines that all time slots that will be used by the transmission are empty in the immediately prior (or n immediately prior) frames. All transmissions in the non-priority class region ideally begin on time-slot boundaries, although they may end on a non-boundary, based on the length of the message.

Transponders self-select time slots, when then need to select a new time slot, in the priority and emergency class regions. They uses a weighted random selection algorithm that causes a higher or equal statistical probability of selecting a end-numbered time slot over a center numbered time slot within the set of available time slots in the currently defined class region. Thus, for the priority class region, time slots tend to "clump" in the lower numbered time slots. For the emergency class region, the weighted random selection algorithm causes selected time slots to clump in the higher numbered time slots. The probability function of the weighted random selection algorithm is monotonic, and the probability of selecting one available time slot in the desired class region is one.

Periodically, a transponder reviews its current time slot selection, using a time slot holding timer. For the priority class region, if the currently selected time slot is within the minimum size for the class region (such as in the first 100 available time slots), or if the current time slot is outside the region that would be defined if the time slot were empty, the transponder should then select a new time slot. However, if high priority or high-risk messages are pending, the selection of a new time slot may be deferred. Time slot holding timers should be selected so as to minimize the likelihood that two transponders within communication range have their time slot holding timers expire at the same time. A suitable time period for the time slot holding timer is 10 seconds to 10 minutes, such as 2 minutes.

An embodiment of a transceiver continues to transmit in its selected time slot until either (a) it receives a transmit collision message involving itself (including self-detection of a message collision), or (b) a time slot holding timer expires and the current time slot number is not in "no-reselection" range. Time slot holding timers may be 1, 2, 5, 10, 15, 30, 60, 90, 120, 180, 240, 300, or 600 seconds. No-reselection ranges may be 10, 20, 25, 50, 75, 100, 125, 150, 200, 250, 500 or 750 available time slots. A preferred embodiment uses a 90 second reselection timer and a 100 available time slot no-reselection range for the priority class region and 25 available time slot no-selection range for the emergency class region.

The size of the priority class and the emergency class regions should be adjusted after the end of every frame. They may be adjusted less often. If the priority class region begins at time slot S1 and ends at time slot S2, it consists of S2−S1+1 time slots. Some of these time slots are empty, as defined above. The remaining time slots are non-empty. A time slot "in use" means that that in the immediately prior (or in one of the n immediately prior) frames, a valid message was received in that time slot. A time slot maybe non-empty but not in use; for example, it may contain noise. An available time slot has to be empty and otherwise be suitable for selection as a time slot by a transponder. Some time slots may be reserved, or otherwise not available. For example, time slot 1 or 1000 may be reserved (to permit much long transmission distances for time slots 1000 or 999, for example).

Note that the range set for each vehicle in a range set may be different, as each vehicle is in a different location and has slightly different communications hardware. Thus, the computed size of the class regions may be different for every vehicle in a particular range set. However, the sizes will not differ by much; and, for vehicles close together, the computed sizes of the class regions will be close. This is one reason for the buffer zones. Also, this is why "non-empty" is used in setting the maximum time slot number of the priority class region, rather than "in use." A transponder just outside a range set may generate "noise" in its time slot, making that time slot unavailable, even though it is not in use in the range set.

Equipped vehicles should send a V2V safety message in the priority class region in every frame, if the vehicle is operating. A parked vehicle may or may not be operating. An operating emergency vehicle may stop sending in the emergency class region if it is no longer operating in an emergency mode. An emergency vehicle may send either emergency or non-emergency, priority messages in the priority class region. An emergency vehicle may send any type of message in the non-priority region, including emergency messages.

Government authorized road-side units (RSU) should generally not change their time slot, once selected, although such a change is permitted, and should occur, if an appropriate message collision notification is received by the RSU. RSUs may use a very long, such as 10 minutes to 10 days, or infinite, time slot holding timer.

When adjusting the sizes of the class regions, the emergency class region is resized first, then the priority class region, and then the non-priority class region. Thus, the non-priority class region gets the "left over" time slots, excluding any times slots in buffer regions or reserved time slots. Reserved time slots may be considered as a buffer region.

A key embodiment is that operating transponders self-select and then repeatedly use one time slot in every frame. In general, low data rate modulation schemes, such as BPSK or QPSK have lower data rates but higher reliability for a given power level, distance or background noise. High data rate modulation schemes, such as 256 QAM have higher data rates at the cost of potentially lower reliability or lower range for a given power level. Since each message in the priority and emergency class regions is generally restricted to one time slot, different modulation schemes translate to different maximum message lengths. Transponders should select the modulation scheme with the highest reliability for the necessary message size. Transponders are permitted to send priority class messages in the non-priority class region.

A message may consist of a Type 0 message, or may consist of one or more of sub-messages. Each sub-message has a non-zero Type number. Table I below shows the size of Type 0 and some sample sub-messages.

TABLE I

Message Sizes in Bits

| Field Name | Size | Type 0 | Header | Type 1 | Type 2 | Type 3 | Elevation |
|---|---|---|---|---|---|---|---|
| V2V revision level | 4 | 4 | 4 | | | | |
| Flags | 4 | 4 | 4 | | | | |
| Message size | 8 | 0 | 8 | | | | |
| Sub-message type | 6 | 0 | | 6 | 6 | 6 | 6 |

TABLE I-continued

Message Sizes in Bits

| Field Name | Size | Type 0 | Header | Type 1 | Type 2 | Type 3 | Elevation |
|---|---|---|---|---|---|---|---|
| Final risk | 4 | 4 | | 0 | 4 | 4 | 0 |
| Vehicle type | 6 | 6 | | 0 | 6 | 6 | 0 |
| Collision type | 4 | 4 | | 0 | 4 | 4 | 0 |
| Risk sources | 4 | 4 | | 0 | 4 | 4 | 0 |
| Offset N-S | 24 | 24 | | 24 | 0 | 24 | 0 |
| Offset E-W | 24 | 24 | | 24 | 0 | 24 | 0 |
| Angle of travel | 10 | 10 | | 10 | 0 | 0 | 0 |
| Speed of travel | 10 | 10 | | 10 | 0 | 0 | 0 |
| Lane type | 8 | 8 | | 0 | 8 | 8 | 0 |
| Risk type | 12 | 12 | | 0 | 12 | 12 | 0 |
| Elevation Offset | 0 | 0 | | 0 | 0 | 0 | 10 |
| Subtotal | 128 | 114 | 16 | 74 | 44 | 92 | 16 |

Field definitions follow. V2V revision level is a 4-bit field that defines the applicable level of features or Standards used by the transponder. A value of zero means that the message is a Type 0 message. The Flags field consists of four binary flags: emergency, final, forward, and proxy. The emergency flag is true if the message is transmitted by an emergency vehicle. The final flag is true if this message is the final frame of a "chained," or multi-part transmission, and true if the message is not a multi-part message. The forward flag is true if the message is a forwarded, rather than an original, message. The proxy flag is true of the message is a proxy message, meaning that vehicle described in the message is not the host vehicle for the transponder. The message size field is an 8 bit unsigned integer that is the number of 24-bit symbols in the message. The sub-message type is a 6-bit field identifying the type, and thus the length (which is fixed for each type of sub-message), of the sub-message. The final risk is a 4-bit field that contains the current computed risk value by the transponder. See the final risk table, elsewhere herein. The vehicle type is a 6-bit field that contains a vehicle type from a pre-determined vehicle type table. The collision type is a 4-bit value that contains a collision type from a pre-determined collision type table. The risk sources field is a 4-bit field comprising four flags to identify the primary reason or reasons for the final risk. These flags are: vehicle behavior, road and weather conditions, traffic, and location history. Vehicle behavior means that one or more vehicles are behaving in an unsafe say; road and weather conditions means that the road condition or weather conditions, such as an icy surface are unsafe; traffic means that the overall behavior of traffic is unsafe; location history means that the stored history of the current location is unsafe. The threshold of "safe" or "unsafe" for the four flags in this field depends, in part, on the final risk value. Offset N-S is a 24 bit signed integer that represents the number of cm on a N-S longitude line from the nearest or selected grid point. Offset E-W is a 24 bit signed integer that represents the number of cm on an E-W altitude line from the nearest or selected grid point. Note that the two Offset fields, as transmitted, may have additional offsets due to location consensus. The two Offset fields make up the vehicle position. They may be considered a vector from the nearest (or selected) pre-defined grid point to the reference location on the vehicle. This embodiment uses distance, which should be either straight line or on the surface of the earth at elevation of the vehicle. Other embodiments may use a unit in degrees, such a 0.1 seconds of arc. Angle of travel is a 10-bit field with an unsigned integer in the range of 0 to 1023, representing the 360° compass divided into 1024 equal headings, with true North being 0. The speed of travel field is an unsigned 10-bit integer that represents the forward speed of the subject vehicle in units of 0.1 m/s. (about 0.2 mph), with an offset of 10 m/s. Thus the range of this field is −10 m/s (field value of 0) to +92.3 m/s (field value of 1023). A stopped vehicle uses a field value of 100. Speeds in the range of −10 m/s to −0.1 m/s represent a vehicle backing up. For a vehicle backing up at a speed greater than 10 m/s, the vehicle should be "turned around," that is, the reference point should be moved to the center of the back of the vehicle and the speed now encoded as positive. This field has an approximate range of −22 mph to 206 mph.

Embodiments of a geographical grid for use in transmitting Offsets from a grid point include any predefined set of grid points; grid points spaced at 2°, 1°, 0.5°, 0.25°, 0.1°, 0.025° for latitude or longitude or both, or any interval in the range of 0.01° to 5°. ½ degree spacing is a good choice. Either or both the geographic grid and the transmitted Offsets may be in units of latitude, longitude, or distance, or any combination. Elevation may also be based on set of elevation intervals while transmitting only an Offset from the nearest predetermined interval in the set. Elevation intervals may be 10, 50, 100, 200, 500, 1000 meters, or any interval between 1 and 1000 meters or between 1 and 1000 feet. Generally, a transponder should use the nearest grid point; however, it should not change a grid point abruptly when another grid point becomes closer. A transponder may change grid points when a majority of vehicles in its range set are using a different grid point. A transponder must determined which grid point, out of as many as four possible grid points, is being used for each received message with a position. Only one such grid point will generate a rational (near by) position.

The PLCC preamble, FCS, SIGNAL, Tail, and other parts and aspects of the transmission, including modulations, but excluding MAC and IP addresses, higher level protocol data, minimum message size and CSMA parameters, are defined by IEEE 802.11p.

A Type 0 message comprises core data, that is: vehicle position, heading and speed, in the fields Offset N-S, Offset E-W, Angle of travel, and speed of travel, as described above. A Type 0 message does not contain any sub-messages and does not contain a message size field. As can be seen from the above Table, this basic, short message contains a substantial amount of data relevant to prevent or mitigate vehicle collisions. If core data is combined with other sub-messages, a Type 1 sub-message may be used. Core data may also include the fields defined above for Type 0 messages.

Figure 3:
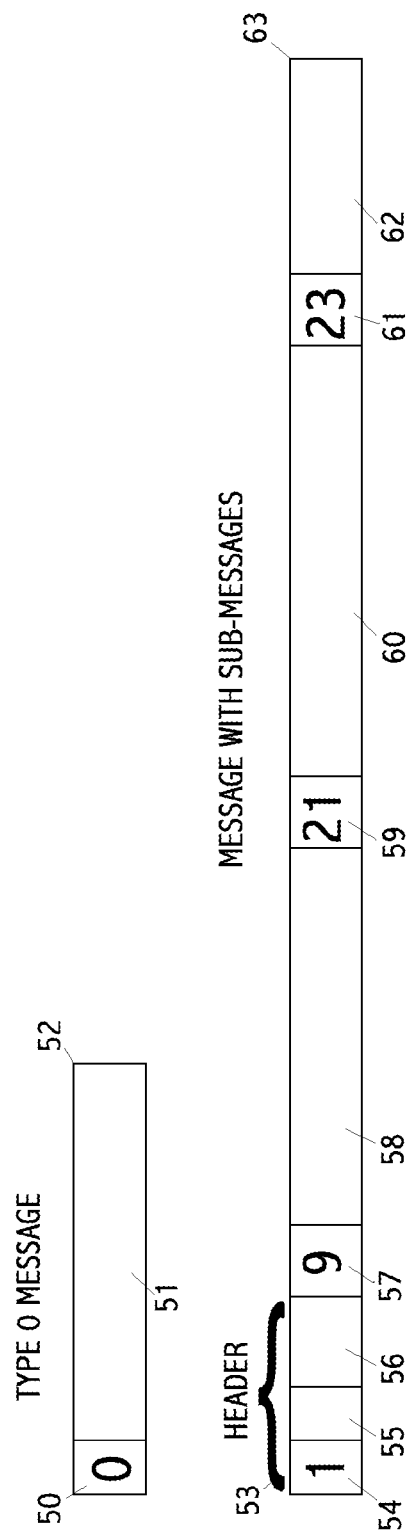
FIG. 3 shows a Type 0 message and a message with sub-messages.

Messages containing sub-messages contain a Header, shown in the above Table. The Header contains a Message size field, which indicates the number of 24-bit symbols in the message. Since each sub-message Type has a fixed length, it is easy to tell if a sub-message is the last sub-message, or if another sub-message follows. Following the Header are one or more sub-messages. Each sub-message begins with a 6-bit Sub-message type field. The Table above shows the fields used in four types of sub-messages: Type 1, Type 2, Type 3, and Null type. Type 1 sub-messages contain the core data of vehicle location, heading and speed. Type 2 sub-messages contain risk and vehicle type fields. Note that Type 1 and Type 2 sub-messages, together, have essentially the same information as a Type 0 message. Type 3 sub-messages are used to communicate a location of a risk that is not the location of the vehicle normally the subject of message of this transponder. It comprises a location, but no heading or speed. For example, it might be the point of expected impact, or a location of an icy patch on a road. The other fields in the Type 3 message provide more information about the nature of the specific risk at the included location in the sub-message. A Null Type is used for padding, if necessary. There are many other sub-messages types, some of which are discussed elsewhere, herein. FIG. 3 shows the layout of a Type 0 message and an exemplary message with sub-messages.

The reference point for the location of a vehicle is the intersection of the center-line of the vehicle and the perpendicular line that comprises the forward most point on the vehicle. The elevation of the reference point is the road surface.

Novel features of an embodiment include broadcasting some or all of the fields and flags described above for a Type 0 message in a priority class region TDMA V2V safety message, such as in at least 50% of all frames. Messages with sub-messages may be used for this purpose.

TABLE III

Sub-message Types and Sub-message Values

| Sub-message Type | |
| --- | --- |
| Type 0 Message | n/a |
| Null message | 0 |
| Vehicle position | 1 |
| Vehicle core data | 2 |
| Message collision using time slot | 3 |
| Message collision using location | 4 |
| Data request | 5 |
| Signal power | 6 |
| Risk detail | 7 |
| Vehicle size detail | 8 |
| Vehicle identity detail | 9 |
| Traffic detail | 10 |
| Conditions detail | 11 |
| Location detail | 12 |
| Accident detail | 13 |
| Detour detail | 14 |
| Forwarding detail | 15 |
| HOV detail | 16 |
| Calibration beacon | 17 |
| Emergency message type | 18 |
| Roadside message type | 19 |
| Traffic signal detail | 20 |
| Courtesy message | 21 |
| Parking detail | 22 |
| Location history | 23 |
| Lane data sharing | 24 |

TABLE III-continued

Sub-message Types and Sub-message Values

| Sub-message Type | |
| --- | --- |
| Message encryption and signing | 25 |
| Audio data | 26 |
| Video or image data | 27 |
| Commercial information | 28 |
| Network Warning | 29 |
| IP embedded | 30 |
| 200 bit | 31 |
| 400 bit | 32 |
| 800 bit | 33 |
| 1600 bit | 34 |
| 3200 bit | 35 |
| 6000 bit | 36 |
| 12000 bit | 37 |
| Elevation | 38 |
| Test - ignore message | 39-62 |
| Test - ignore message | 63 |

TABLE IV

Risk Values and Meaning

| Value | Risk Meaning |
| --- | --- |
| 0 | No risk value in this message. |
| 1 | No risk behavior identified, "zero known risk." |
| 3 | Challenging driving conditions; increase caution. |
| 4 | Significant potential risk; drivers should be aware of the risk source. |
| 5 | Significant, defined risk; drivers or vehicles should modify behavior. |
| 8 | Very high risk; automatic mitigation or avoidance strongly recommended. |
| 9 | A collision is predicted; automatic avoidance and mitigation required. |
| 10 | A collision has occurred. |

TABLE V

Collision Type Values and Meaning

| Value | Collision Type |
| --- | --- |
| 0 | No collision information in message |
| 1 | Rear-ender |
| 3 | Side-swipe |
| 4 | Head-on |
| 5 | Pedestrian, bicycle, or motorcycle |
| 6 | Multi-vehicle |
| 7 | Single-vehicle on roadway |
| 8 | Single-vehicle off roadway |
| 9-14 | reserved |
| 15 | unknown collision type |

TABLE VI

Message Collision Notification Sub-Message Using Time Slot

| Bits | Field Name |
| --- | --- |
| 6 | Sub-message type (value = 3) |
| 12 | Message collision time slot number (range 0-4096) |
| 4 | Number of detected messages collision in this time slot (range 1-15) |
| 4 | Received signal power in the time slot (range 1-15) |
| 4 | reserved |
| 30 | Total bits in sub-message |

TABLE VII

Message Collision Notification Sub-Message Using Location

| Bits | Field Name |
|---|---|
| 6 | Sub-message type (value = 4) |
| 12 | Message collision time slot number (range 0-4096) |
| 24 | Position Offset N-S |
| 24 | Position Offset E-W |
| 4 | Number of detected messages collision in this time slot (range 1-15) |
| 4 | Received signal power in the time slot (range 1-15) |
| 4 | reserved |
| 78 | Total bits in sub-message |

TABLE VIII

Vehicle Type and Value

| Vehicle Type | |
|---|---|
| no vehicle type in message | 0 |
| private car, pickup or van | 1 |
| limousine, long or stretch | 2 |
| commercial car, pickup or van | 3 |
| medium size commercial truck | 4 |
| stopped medium delivery vehicle | 5 |
| semi tractor only | 6 |
| semi, one trailer | 7 |
| semi, two trailers | 8 |
| short bus | 9 |
| full-size bus or RV | 10 |
| emergency vehicle, up to medium | 11 |
| emergency vehicle, large | 12 |
| farm or construction vehicle | 13 |
| oversize vehicle | 14 |
| roadside fixed equipment | 15 |
| roadside fixed obstruction | 16 |
| in roadway debris | 17 |
| accident | 18 |
| roadside construction equipment | 19 |
| bicyclist | 20 |
| pedestrian, upright | 21 |
| pedestrian, high speed | 22 |
| handicapped person, e.g. wheelchair | 23 |
| person down on roadway | 24 |
| crowd on roadway | 25 |
| event on roadway (e.g. crafts fair) | 26 |
| domestic animal e.g. guide dog | 27 |
| non-domestic animal, e.g. livestock | 28 |
| other tiny (size TBD) | 29 |
| other small (size TBD) | 30 |
| other medium (size TBD) | 31 |
| other large (size TBD) | 32 |
| other oversize (size TBD) | 33 |
| reserved | 34-62 |
| unknown vehicle type | 63 |

Table II—There is no Table II.

Table III—Sub-message Types and Sub-message Values, above, shows one embodiment of sub-message types, where the sub-message type is encoded in a 6-bit field. Each sub-message type is fixed length, not shown in this table. Messages are either Type 0, which has no sub-message type and no sub-messages, or contains a Header as shown in Table I, plus one or more sub-messages, where each sub-message begins with a sub-message type field. Sub-messages in a message are parsed in sequence. The length field in the header identifies if there is another sub-message in the message.

Table IV—Risk Values and Meaning, above, shows one embodiment of how risks are coded in a 4-bit field. Typically, a vehicle operator, owner, or manufacturer will determine what actions to take based on the receiving transponder and other vehicle circuitry's risk determination, which may weigh heavily the received risk value. Typically, low risk values cause no action; intermediate risk values provide visual, audible, or haptic warnings of increasing urgency; high risk values trigger automatic response or mitigation measures. It is desirable to standardize, to some level, vehicle responses to received risk. A 10-value table such as this is easy for people to understand. A risk level of 4 or high is generally considered "high risk," where a driver should be notified and message priority may change. A risk level of 8 or higher should cause automatic vehicle accident avoidance and mitigation.

Table V—Collision Type Values and Meaning, above, shows one embodiment of how collision types are coded in a 4-bit field. The collision types shown make up nearly vehicle collisions. For vehicle to know the potential or predicted (most likely) collision type is a significant advantage. Avoidance or mitigation actions vary significantly based on the type of collision to avoid. Avoidance or mitigation is significantly different for a vehicle about to run over a pedestrian from a vehicle about to be hit from the side by a truck.

Table VI—Message Collision Notification Sub-Message Using Time Slot, above, shows one embodiment of sub-message collision notification fields. The field names and ranges are explained elsewhere herein. If the number of message collisions for this time slot is more than 15, the value 15 is used. The value 0 may be used for testing. The received signal power level is a value in the range 1 to 15. This is useful in estimating how far away the sources of the message collision may be. It is also useful for selecting from a set of conflicting message collision messages, should that happen. A value of 0 may be used for testing.

Reserved bits in any message or table allow for future revisions and enhancements. These are communicated in the protocol using the V2V Revision Level field.

Table VII—Message Collision Notification Sub-Message Using Location, above, shows another embodiment of sub-message collision notification fields. This sub-message has the same fields as the above sub-message in Table VI, with the addition of a position of one vehicle that is believed to be a participant in the message collision. Typically, a first transponder is receiving regular valid messages in a first time slot from a second vehicle. Then, a message collision is identified in the first time slot. The highest likelihood situation is that the second transponder is one of the participants in the message collision, and the last sent vehicle position (and heading and speed) of the second vehicle may be used to inform the transponder for the second vehicle of the message collision. This second vehicle is likely the closest vehicle participating in the message collision, and thus has the highest likelihood of receiving the message collision notification properly. This sub-message type is preferred over the sub-message type of Table VI, if it is available.

Table VIII—Vehicle Type and Value, above, shows an embodiment of coding a vehicle type into V2V messages, including core data Type 0 messages. A 6-bit field is used. The purpose of this field is not to include all possible vehicle types, but rather to provide critical information that is needed to make a reasonable safety or collision avoidance or mitigation response. There is a critical difference in being about to be hit from the side by a semi or are about to run over a pedestrian down on the road. Thus, size, weight and fundamental category (truck, pedestrian, animal, etc.) are the primary differentiators of different vehicle types in this field.

FIG. 1 shows an exemplary frame, time slots and three class regions. This frame is 1000 time slots, starting with time slot 1, shown as reference designator 10, up through time slot 1000, shown as reference designator 20. The TDMA managed priority class region is shown with bracket 22 and comprises time slots 1 through 24. The CSMA managed non-priority class region is shown with bracket 23 and comprises time slots 29 through 989. The TDMA managed emergency class region is shown with bracket 24 and comprises time slots 994 through 1000. Two buffer zones between the CSMA and the TDMA regions are shown as 13 and 17. Each of these buffer zones is shown as four time slots in size. In the priority class region, three time slots are in use, shown as designators 11 and 12. These time slots are numbered 2, 7 and 9. Note that these three time slots are "clumped" near the time slot number 1 end of the priority class region. In the emergency class region, one time slot is in use, number 998, shown with designator 19. Designator 21 shows three dots indicating that the frames repeat continuously. The frame shown may be 0.1 ms in length, with 1000 time slots each 100 µs in length. In the CSMA managed non-priority region, two messages are shown, 15. Note that these messages are variable length and are longer than one time slot. Although there are time slots in the non-priority region, time slots are less important than in the TDMA managed regions, and are not shown in FIG. 1 except for four time slots at the beginning and one time slot at the end. Designator 14 shows with three dots how these time slots continue throughout the non-priority class region. Designator 16 shows the last time slot, number 989, of the non-priority region. Empty time slots are shown as white. Designator 18 shows time slot number 994, which may be considered the "last" time slot in the emergency class region (with the region "starting" with time slot number 1000, designator 20) as the emergency class region grows downward as demand in the region increases. As demand for the priority region increases, the border between the priority and non-priority regions moves upward, and thus the non-priority region become smaller. As demand for the emergency region increases, the border between the emergency and non-priority regions moves downward, and thus the non-priority region become smaller. The buffer zones are optional, and may vary in size depending on the size of the nearest TDMA region.

In FIG. 1, the priority class region is time slot numbers from S1 to S2, where S1 is 1 and S2 is 24. The non-priority class region is S3 to S4, where S3 is 29 and S4 is 989. The emergency class region is S5 to S6, where S5 is 994 and S6 is 1000. This embodiment may have a frame of 100 ms, with 1000, 100 µs time slots. Alternative time slot times are 500, 200 µs time slots, and 250, 400 µs time slots.

In FIG. 1, designator 15 shows two CSMA messages in the non-priority class region. Note that the time gap between the two messages is larger than the time width of one time slot, indicating an embodiment where the inter-message guard time (called the inter-frame time in IEEE 802) is larger in this class region than in the two TDMA regions. Transmit power and desired or effective communication range may be higher, too. Modulation may be different, as well; for example, it may be higher bit rate modulation to encode more data at the cost of lower reliability delivery of the non-critical message.

Figure 2:
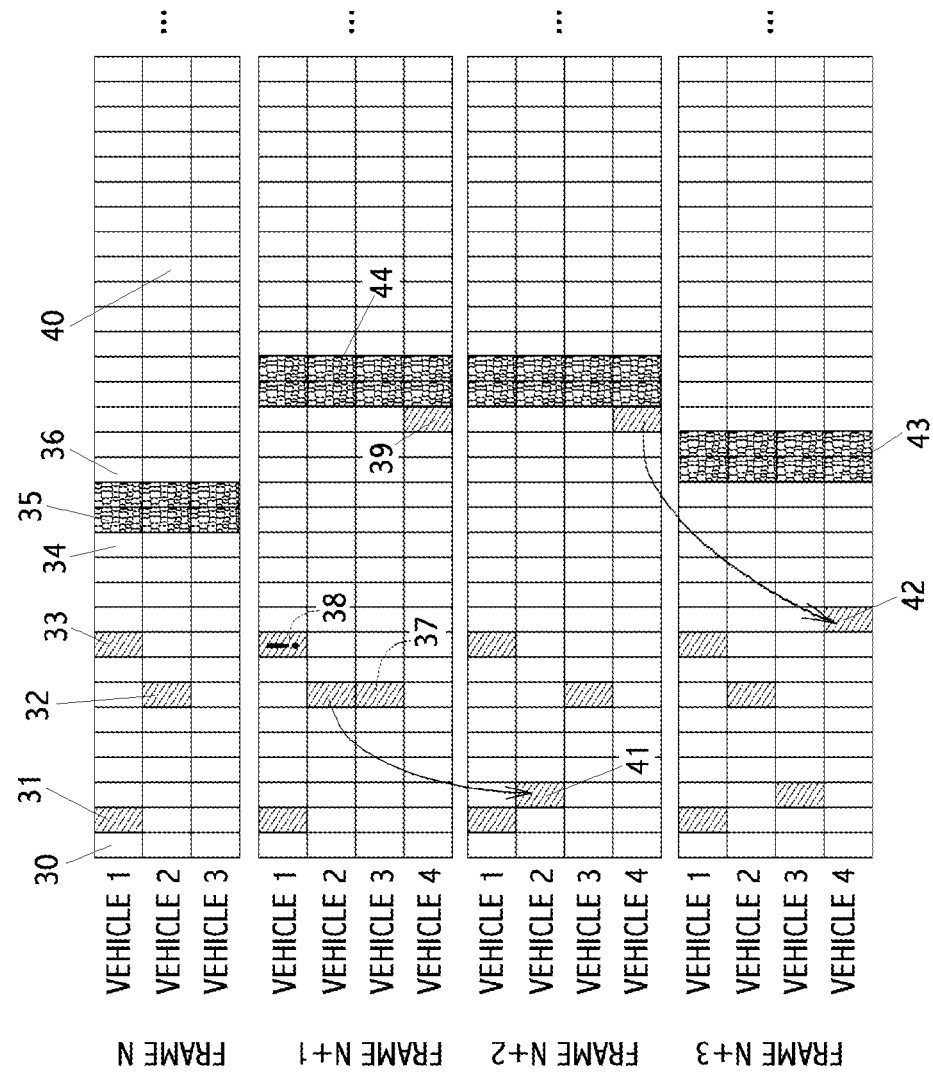
FIG. 2 shows four exemplary frames with numerous time slot activities, include a message collision and class region re-sizing.

FIG. 2 shows some exemplary frame portions with time slot activity. Four frames are shown, nominally consecutive frames (but not necessarily), labeled "FRAME N," "FRAME N+1," "FRAME N+2," and "FRAME N+3." Only the first 32 time slots are shown, and time slots numbers are not shown in the Figure. Three dots indicate the time slots continue. Time slot usage for four vehicles is shown, "VEHICLE 1" through "VEHICLE 4." In FRAME N, only two vehicles are shown transmitting: VEHICLE 1 and VEHICLE 2. VEHICLE 3 may be out of radio range, for example. Reference designator 30 shows time slot number 1. Each time slot is repeated as a column in the Figure. Designator 31 shows VEHICLE 1 broadcasting in time slot number 2. Designator 32 shows VEHICLE 2 broadcasting in time slot number 7. Designator 33 shows VEHICLE 1 also broadcasting in time slot number 9. VEHICLE 1 is broadcasting in two time slots likely because it is proxying another vehicle. Designator 34 shows time slot 13, which is the last time slot in the current priority region. Note that there are three time slots used (numbers 2, 7 and 9) and ten empty time slots. Ten empty time slots may be the predetermined minimum number of empty time slots for the priority region, in this example. Designator 35 shows the start of a two-time-slot buffer region, in time slots 14 and 15. Designator 36 shows the first time slot in the non-priority region. Designator 40 shows generally the non-priority region, which in this Figure, has no broadcasts for the pictured time period.

Continuing with FIG. 2, in FRAME N+1 we observer five new activities. First, VEHICLE 3 is now broadcasting in range, using time slot 7, shown as designator 37. Second, there is a message collision in time slot 7 because both VEHICLE 2 and VEHICLE 3 are broadcasting in the same time slot. Third, the transponder for VEHICLE 1 has detected the message collision and is broadcasting a message collision notification message, shown with the exclamation mark, as designator 38. Fourth, VEHICLE 4 is also with range, using time slot number 18. Note that this time slot was not in the range of the priority class region in FRAME N. This may be due to VEHICLE 4's determination of the size of the priority region was larger than shown in FRAME N (for the range set of VEHICLE 1 and VEHICLE 2). Alternatively, VEHICLE 4 may have trouble getting an empty slot, and so VEHICLE 4 expanded the size of the priority class region by choosing a time slot in a buffer zone, or even in the prior non-priority region. Fifth, as a result of VEHICLE 4's use of time slot 18, the size of the priority region immediately expands to 18 time slots, as shown by the moved buffer zone, designator 44. In time slot number 18 VEHICLE 4 has received VEHICLE 1's message collision notification. Thus, even though VEHICLE 4 also observed the message collision in time slot number 4, it does not send a message notification message, designator 39. In this example, the number of allowed message notifications of the same message collision is one. If it were two or higher, then the time slot at designator 39 would contain a second message collision notification message. Such a message might have identified VEHICLE 3, instead of VEHICLE 2, as possibly vehicles 3 and 4 are travelling close together, and so VEHICLE 4 has been receiving VEHICLE 3's message in time slot 7 for some time.

Continuing with FIG. 2, in FRAME N+2, we observe that VEHICLE 1's message collision notification message in time slot 9 is received by VEHICLE 2. VEHICLE 2 immediately selects a new empty time slot, here time slot number 3, shown with designator 41. VEHICLE 1 has a choice of two message collision notification types. It may identify the message collision by the time slot, here number 7, or by VEHICLE 2's location. It knows (likely) that VEHICLE 2 is participating in the message collision due to the VEHICLE 2's use of time slot 7 in the prior FRAME N, shown as designator 32. In this case, only VEHICLE 2 needs to select a new time slot. If VEHICLE 1 had instead used time slot number 7 in its message collision notification message, designator 38, then both VEHICLE 2 and VEHICLE 3 would have selected new time slots, assuming that both vehicles properly received the notification message.

Continuing with FIG. 2, in FRAME N+3 we see that VEHICLE 4 has selected a new time slot number 10, designator 42. Since the minimum size of the priority class region is only 10 empty time slots, in this example, and in FRAME N+2 there are 13 empty time slots, when VEHICLE 4's time slot holding time expires at the end of FRAME N+2, it chooses a new frame, hopefully one with a lower frame number, allowing the size of the priority class regions to shrink and the non-priority region to expand. Indeed we see this as the buffer zone has not moved, designator 43, such than in FRAME N+3 there are again exactly 10 empty time slots in the priority class region.

FIG. 3 shows a block diagram of two message types: a Type 0 message and a message with sub-messages. A Type 0 message does not have sub-messages and does not use a header. The first field, designator 50, consists of a zero. The fields, not detailed in this Figure, follow, designator 51. Designator 52 shows the overall Type 0 message. Not shown are any preamble, SIGNAL, FCS, tail bits, and the like. A message with sub-messages, an example of which is shown in this Figure as designator 63, usually contains more data than a Type 0 message. In this Figure, the relative length of the two messages indicates data quantity, not broadcast time. Designator 53 shows the three header fields, indicated by the bracket. This message contains three sub-messages. Designator 54 shows the V2V Revision Level field, here with a value of one. Designator 55 shows the 4-bit Flags field. Designator 56 shows the 8-bit message size field for this entire message, in units of 24-bit symbols. Designator 57 shows the first sub-message type field, here with a value of nine, to indicate a Vehicle Identity Detail sub-message. The data in this sub-message follows, designator 58. Each sub-message size is fixed by its Type. The message length in the header, designator 56, indicates there is more data in the message. The next sub-message begins with a Type field, designator 59, here with a value of 21, indicating a Lane Data Sharing sub-message. The data for this sub-message follows, designator 60. Again, the message length indicates another sub-message, beginning with a Type field, designator 61, here with the value 23, indicating a Parking Detail sub-message. The data for this sub-message follows, designator 62. These three sub-messages together with the Header, are the length of the header length field, so no more sub-messages follow.

Figure 4:
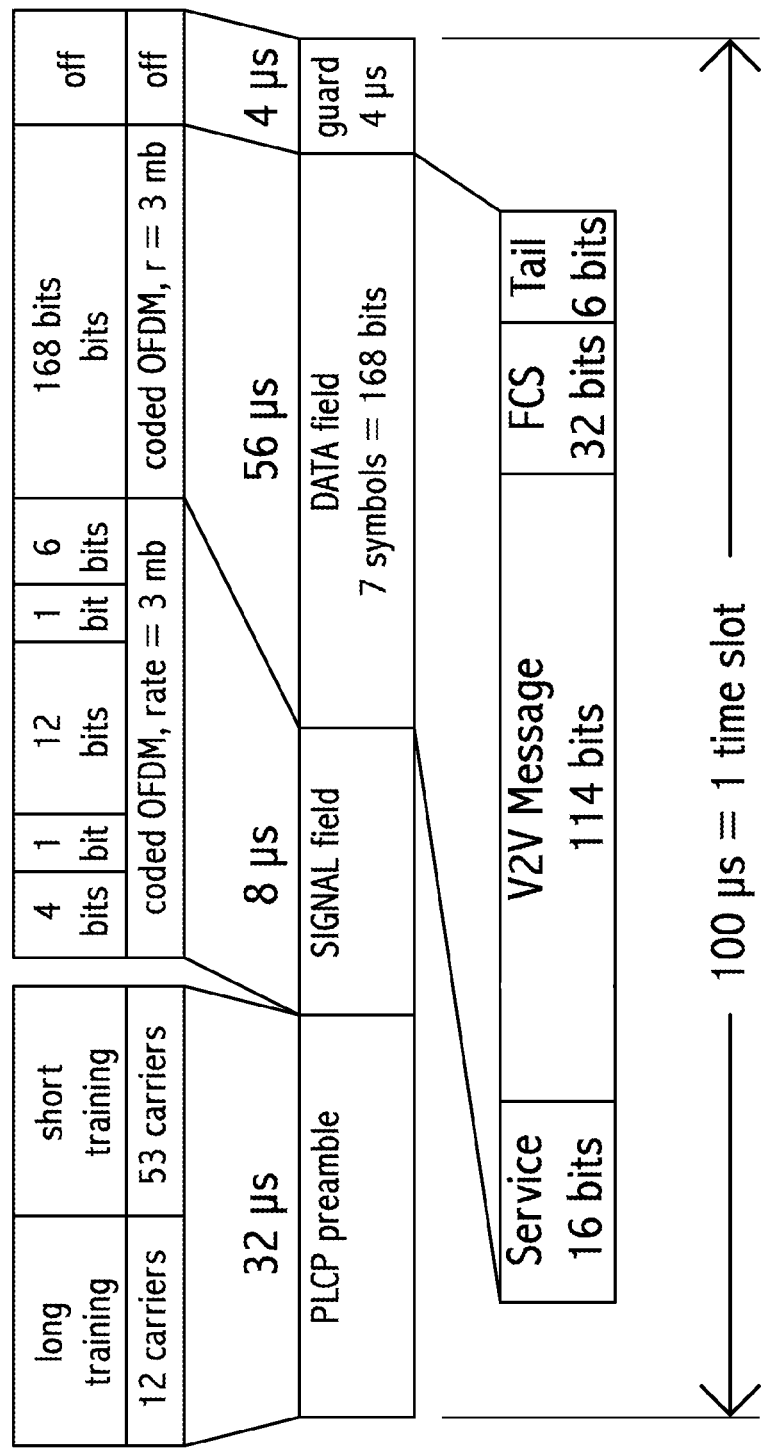
FIG. 4 shows a single 100 µs message frame in IEEE 802.11p format, with a 3 mbit/s modulation, comprising SIGNAL, SERVICE, FCS, and Tail fields, with 114 bits available for a V2V message.

FIG. 4 shows the field lengths and timing for message using 3 mbit/sec (mb/s) modulation for a 100 μs time slot, including a 4 μs guard time. The available time for V2V message data is 7, 24-bit symbols, including the SERVICE, FCS and tail bits, leaving 114 bits net for the message.

Figure 5:
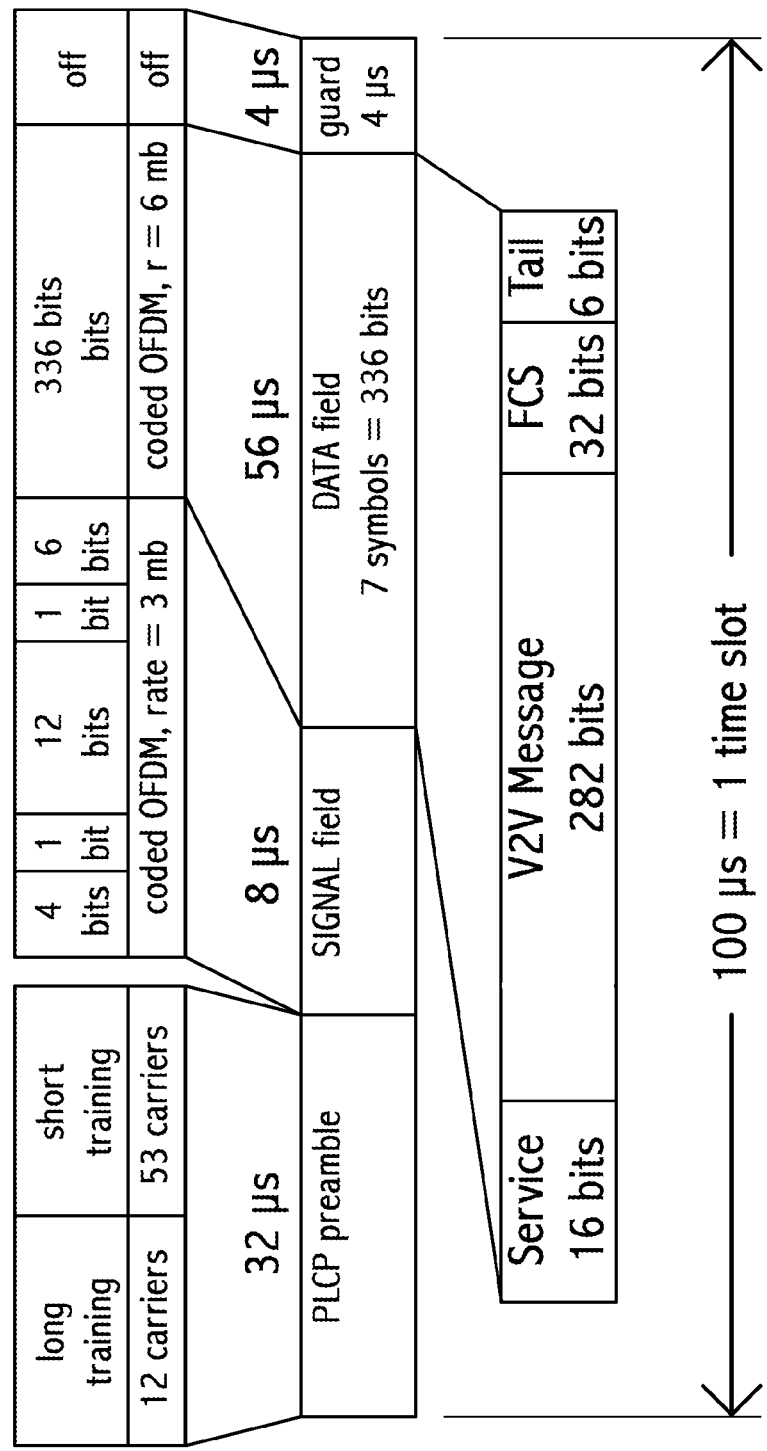
FIG. 5 shows a single 100 µs message frame in IEEE 802.11p format, with a 6 mbit/s modulation, comprising SIGNAL, SERVICE, FCS, and Tail fields, with 282 bits available for a V2V message.

FIG. 5 shows a diagram, timing and V2V message size as in FIG. 4, but for 6 mb/s modulation. The available time for V2V message data is 7, 48-bit symbols, leaving 282 bits net for the V2V message. Calculating net message length for other modulations, other time slot lengths, and other guard times is done similarly.

Figure 6:
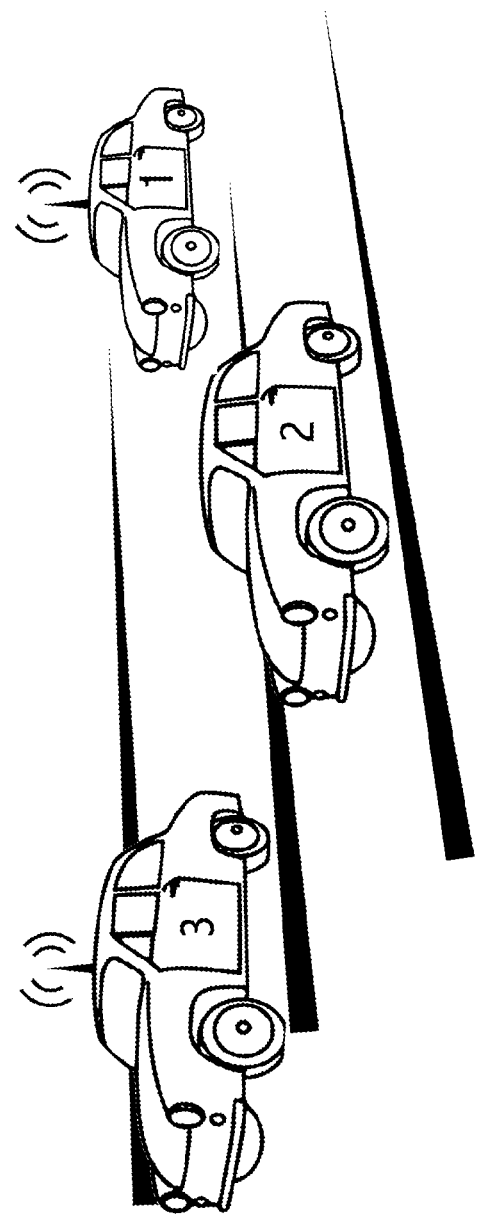
FIG. 6 shows three exemplary vehicles in two traffic lanes, with vehicles 1 and 3 V2V transponder equipped, vehicle 2 unequipped and being proxied.

FIG. 6 shows three vehicles. Vehicle 1 and 3 are equipped with a V2V transponder. Vehicle 2 is not equipped. It is being proxied by either vehicle 1 or vehicle 3.

Figure 7:
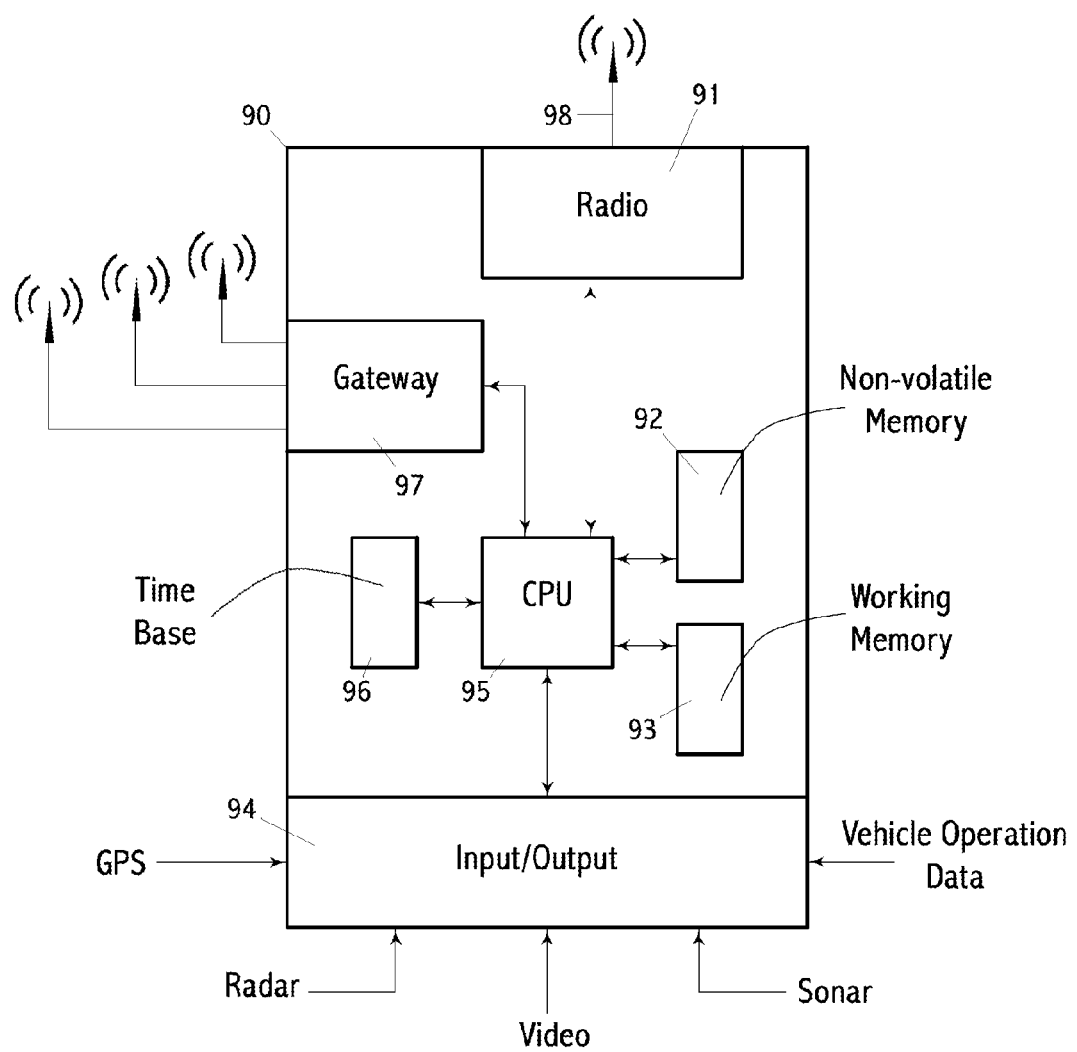
FIG. 7 shows an a block diagram of an embodiment of a transponder.

FIG. 7 shows an embodiment of a block diagram of a V2V transponder, 90. 91 is the radio, which can send and receive in authorized V2V bands and modulations. 92 is non-volatile memory to hold lane records, road history, firmware, and the like. 93 is working memory, such as RAM. 95 is a CPU, processor, or a plurality of processors, include DSPs, for example. 96 is a time base, which may comprise a ovenized or temperature compensated crystal oscillator with an accuracy of 0.5 to 10 parts in 10^13 per day, and accepts GPS or other satellite time as an input. 94 shows many input output capabilities, such as vehicle operation data (such as speed, heading, state of controls, braking, lights, etc.), sonar, radar and video for determining the relative position, heading and speed of nearby vehicles for location and elevation consensus, video or still image input for security and road documentation, and GPS or another satellite system for course location and timing. This list is not exhaustive. A gateway, 97, may provide connectivity to other networks, such as WiFi, cellular phone and cellular data, Bluetooth, and the like. 98 is the V2V radio antenna.

FIG. 8 shows exemplary data base entries for tracking vehicles. Four vehicles are shown in rows, with Vehicle Numbers, an internal number for vehicle tracking, in column 110. The long rows are broken into two portions for presentation in the Figure. The four rows are the same Table rows for both the upper and lower portions of the Figure. We note that vehicle 123 is shown being proxied, in column 111. The time slot of the last valid transmission for each vehicle is shown in column 112. We see that vehicle 121 has a status of dormant, in column 113, because we have not received a valid transmission since 14:19:8.0, in column 116. After a period of time, or if the last known position becomes past a threshold distance, vehicle 121 will be removed from the table. Vehicles 122, 123, and 126 have made broadcasts received as valid in the last frame, shown as the times in column 116 which might be in units of hours:minutes:seconds and tenths-of-seconds. There are no entries in the table for vehicles 124 and 125. Most likely, they were placed in the table and then removed as no longer in range. Vehicle 126 is new, meaning we have no history of prior transmissions. Thus, certain information about vehicles may be unknown; for example, its acceleration. Also, we may not know a permanent ID (not shown in the Figure), as that data may be transmitted less frequently. Column 113, Status, keeps track of the current status of the vehicle with respect to maintaining this Table. Column 114 identifies any known Risks associated with a vehicle. Columns 115 through 118 directly reflect the most recent core vehicle data for that vehicle. Not all core data is shown in the Table. Column 115 is not shown with actual data in this Figure. Location, column 115, has two components, along two axes. Note that data in this Table may not be stored in memory in the convenient visual units shown in the Figure. Also, data in the Table may be in different formats or units from the data transmitted by transponders. Column 116 shows the time of frame of the last valid received transmission. Column 117 shows the vehicle's reported speed. Column 118 shows the vehicle's reported heading. Vehicles 122, 123 and 126 appear to be going in the same general direction, while vehicle 121 was last headed in a significantly different direction. A change in heading may be an early indication of a lane change, or of a vehicle wandering from its safer path. Column 119 is computed based on recent transmission. Typically, vehicles do not directly report acceleration. Units are not shown in this Figure, but note that no acceleration for vehicle 126 is yet available. Column 120 is computed by the transponder, based on columns 115 through 119. It is the computed location for the vehicle expected to be received in the next frame. Column 121 shows for which time the locations in column 120 are computed. Column 120 may be used in the process of maintaining a match between a specific (real) vehicle, as tracked in column 110, and its transmissions. For any given received message comprising location data, that location data may be compared against every entry in the Table in column 120, with a vector difference in location computed. Here we see, in column 122, such a result for an undisclosed received location. Note that clearly the transmission belongs to vehicle 126, as the error—the difference between expected position and received position—is only 0.06 m, or 6 cm off from expected. The errors for the other vehicles in the table are unreasonably high for a possible match. One embodiment chooses the entry with the lowest computed error in column 122, then updates the matching row for columns 115 through 118 with the data received. For each frame, columns 119 through 121 are recomputed for each row in the Table. Columns 111 through 114 may also be updated. If necessary, rows are added or deleted as new vehicles come into range, or leave the range. Other embodiments may use other matching algorithms, such as checking only the row with the matching time slot number, to see if the error is acceptably low, before searching the entire Table. Alternatively, the Table could be sorted by column 120 to make searching for the closest location a binary search.

For short V2V message, the overhead of individual transmissions is considerable. Therefore, the overhead should be minimized. One such overhead is the guard time between messages. The purpose of the guard time is prevent time-of-flight from causing two messages in two adjacent time slots from overlapping. The time-of-flight is the maximum operating distance of a range set divided by the speed of light. Appropriate operating distance in in the range of 10 meters to 10 km. An ideal maximum operating range for the priority class region is 1 km, with 5 km being ideal for non-priority and emergency class regions. Time of flight for 1 km is 3.34 μs. If the maximum allowable time base error for a transponder is 0.250 μs, then 3.34+2*(0.25)=3.84 μs is the minimum guard time for a 1 km maximum operating range.

A range set for a first vehicle is a set of vehicles that are communicating with a first vehicle at any given time. The range set for the vehicles in a range set is typically not the same. Thus, range sets "overlap."

The primary purpose of priority class messages is to avoid or mitigate collisions. Thus, the effective range for the priority class need not be far. Purposes for the non-priority class and the emergency class regions vary. The non-priority class region may be used for travel information, toll and parking fee collection, data-base sharing (such as street history and lane maps), courtesy messages (such as, "your tail lights are out"), message forwarding, parking information, event information, traffic signal communication and optimization, traffic flow optimization, emergency management, and the like. Thus, a longer maximum operating range is appropriate, such as 1 km to 100 km. One such range is 5 km. Thus, the inter-transmission guard time may vary between class regions. The inter-transmission guard time may be fixed or dynamic. Consensus may be used to arrive at an agreed dynamic maximum range for a range set.

All transponders participate in identifying message collisions, including the transmitting transponder. Those trained in the art know there are multiple ways of detecting a message collision, such as high signal strength with an invalid preamble, FCS or modulation; or the signal/noise ratio in a given time slot suddenly increasing. A message collision notification message is typically broadcast in the transponder's priority class region time slot. However, it may be transmitted in the non-priority class region. Also, a transponder may select a new, second time slot for the purpose of sending a message collision notification message, however this is normally done only if it appears that the first such message or messages were not received by at least one of the sources of the message collision. Message collision notifications should be sent as soon as possible when a message collision is detected. In an alternative embodiment, two (or more) consecutive message collisions must be detected before a message collision notification message is sent. This alternative allows at least one of the sources of the message collision to self-detect the collision and select a new time slot without using up any bandwidth for message collision notifications.

When a transponder detects a message collision is also listens for any message collision notification messages, which may be broadcast, prior to its own planned broadcast. When it detects one or more such equivalent (identifying the same message collision) message collision notifications, it does not send an additional, and thus duplicate message. However, it is important that message collisions are recognized by the participants in the message collision rapidly. Therefore, an appropriate number of message collision notifications is often more than one. An appropriate number of such similar notifications is in the range of 1 to 5, where 2 is a good choice.

There are two ways to identify the sources of a message collision. The first method is by the time slot number. The second method is by identifying at least one of the vehicles. The vehicle identification is the position of the vehicle. The result of the first method is that typically both participants will receive the message collision notification and both will immediately select a new time slot. However, sometimes only one vehicle will receive the message collision notification and thus only that transponder will select a new time slot, which solves the message collision. The result of the second method is that if only one vehicle is identified, then only one vehicle selects a new time slot, which minimizes the chance that the newly selected time slot will also result in another message collision.

Selection of a new time slot not due to a message collision should be infrequent enough to reduce the chance of such a new time slot selection producing a message collision in that time slot below a threshold, yet frequent enough to keep the size of the priority and emergency class regions as small as reasonable, subject to the constrains of the embodiment. Such a constraint may be a minimum likelihood of having a message collision in the newly selected time slot, such as below 10%, below 5%, below 1%, below 0.5%, below 0.1%, or below 0.05% probability. The constraints for selecting a new time slot based on a current message collision compared to selecting a new time slot for a different reason, may be different or the same. The constraint may be responsive to current risk or to message priority. The constraint may alter the new time slot selection function. For example, the range of available time slots in a class region may be expanded or reduced to meet the constraint. As another example, the shape of the function may be altered, such as from exponential to linear, or from linear to flat.

Vehicle location is always the location of the vehicle (the vehicle's reference point) at the end of the frame in which the message is sent. (In some embodiment, another fixed time relative to the same frame.) Thus, for a moving vehicle, the vehicle position and thus the vehicle identification in a message changes. The vehicle position need only be within an allowable error for the vehicle to be clearly and consistently identified. One such method uses the "closest vehicle"

(closest reference point on the vehicles) to the position in the message. Another message uses a maximum allowable distance, which may vary with vehicle speed, or other factors. A range of such allowable distance is 100 cm to 10 meters, with 1 or 2 meters being a good choice.

MAC and IP addresses are defined the relevant IEEE standards and by the relevant Internet RFPs.

Messages are broadcast in cleartext without any MAC or IP addresses, as they take up too much bandwidth and have no value in a V2V application. Eliminating MAC and IP addresses also eliminates the need for a central authority to assign and monitor their usage.

Hacking may be detected by comparing the claimed location of a vehicle with visible observation (such as machine vision) otherwise detectable (such as the use of sonar, radar or LIDAR) location. Hacking may also be detected by noticing that the time of flight of the message is inconsistent with the claimed location, for a non-proxied transmission. Hacking may be mitigated by taking photographs, and asking other vehicles to take photographs of the suspected hacking source. Hacking may also be mitigated by sending hacking warning messages, which are forwarded by other transponders, to an appropriate authority, or transmitted out of band, such as via cellular networks. Also hacking warning messages may be used to caution other vehicles against taking any risk or unusual behavior as a result of bad information. Potential hacking data be stored, and optionally signed with a PKI certificate, for use in prosecution.

Sometimes it is desirable for a vehicle to identify itself with a pre-assigned, permanent identification, such a license plate, VIN number, IP address, emergency vehicle ID, or cell phone or serial number. Such a linking message may be transmitted when needed, or periodically, using the non-priority class region, and using a time slot number or vehicle location to link the pre-assigned ID to the vehicle's messages. An appropriate frequency of such ID linking messages is 1 to 30 seconds, with 5 seconds being a good choice.

There is a necessity for some vehicle elevation information to be present in the system. If all locations or positions were merely projected on to a surface of the earth then for a non-grade-level crossing, such as an overpass, the vehicles would appear to be passing through each other. A V2V system must be able to distinguish grade-separated traffic from grade-level traffic. This applies to train, animal, bicycle and pedestrian overpasses and underpasses, as well as vehicle grade-separations.

There are two specifically defined embodiments herein that address this issue. The first is to regularly broadcast elevation, like position, only less frequently. The recommended time for an elevation message is in the range of interval is 500 ms to 15 s, with 1 second being a good choice. Elevation messages may be only sent when elevation of the vehicle or the lane changes more than a predetermined amount. The preferred format for this message is to provide a signed 10-bit number that represents the elevation of the transportation surface (e.g. street or path) in units of 10 cm from the nearest 100 m interval above mean sea level, using the same geodetic system as for location. Thus, this number has a range of −51.2 to +51.1 meters. One or more bits may be used to indicate a sudden, rather than a smooth, elevation change, such as a curb, speed hump, or pothole.

A sub-message of type 38, for an "Elevation Sub-message" may be used to communicate the elevation of the reference point on the subject vehicle. The reference point is always at the grade or street level, and thus serves to define the street height at the location of the vehicle reference point. Another elevation sub-message, not described elsewhere, also includes the Offset N-S and Offset E-W position fields. This sub-message is not used to describe the location of the subject vehicle, but rather the street height at some OTHER location: the position in the sub-message. This message type may be use to describe curbs, speed-humps, potholes, and the like. They type 38 Elevation Sub-message is short: only 16 bits, or slightly longer if a "sudden change" field or flag is used. Thus, it may often be included in other messages that have available bits for a chosen modulation. Because the Elevation Sub-message is generally not time-critical, this provides substantial flexibility to the transponders. Elevation sub-messages may be sent in the non-priority class region, or as part of a priority class region message.

A preferred embodiment is for vehicles to use a "consensus based" averaging for elevation, similar to the consensus based averaging use to achieve consistent position coordinates. For the vehicles in a range set, each vehicle averages its own best computation of "true" or "baseline" elevation with the received elevations of the other vehicles in the range set (corrected for detected relative elevation differences in the surface or lanes), then uses this average in future transmissions (again, adjusted for changes in the surface since the point of the average determination). Vehicles should minimize the rate of change of elevation broadcasts due to consensus adjustments to avoid an artifact of incorrect apparent climbing or descending. The preferred maximum rate of elevation change due to such consensus adjustments is 0.1 m/s/s.

Transponders may send elevation sub-messages more frequently when the elevation of the road surface changes.

Vehicles should use an accelerometer, inclinometer, or other inertial navigation sensors to maintain a smooth continuum of "true" or "baseline" elevation changes while moving, if in fact the surface is smooth.

An additional embodiment is to include elevation in lane information. For relatively linear lane (segments) a starting and ending elevation may be used, although a Bézier or B-spline point at each end is preferred. For most under- and over-passes, a small set of Bézier of B-spline curves in the vertical plane is preferred. Typically, three such points (each with a center location and two control points), one at the maximum (or minimum) of the overpass (or underpass), plus one each at appropriately chosen side locations are adequate. The data in the Bézier of B-spline curves should use the same 10-bit format described above.

Note that the preferred embodiment for elevation is sufficient to indicate curbs, potholes, speed bumps, and other permanent, temporary, intentional or accidental variations in surface height. For the purposes of safety, high precision (say, 1 cm) in not necessary in representing these objects, only that that exist. Thus, identifying an object (by type, such as curb, pothole or speed bump), or simply as a lane discontinuity, using described data formats for either vehicle height or lane elevation, is supported in the described embodiments. For example, if a vehicle hits a pothole (recognizing that the pothole is most likely under a wheel, not in the center of the lane), it might choose to broadcast three elevation messages in succession (say, 0.1 s apart) indicating the effective elevation change. Even with a single bit change (10 cm) receipt of such a message sequence is a clear indication of the object. A field of flag indicating a sudden change is elevation is also an embodiment. Such a field or flag may be in an elevation sub-message or in a lane record, or both.

Similarly, as a pedestrian steps off of a curb, a mobile device (a smart phone, using, for example, its internal accelerometer) could broadcast that elevation change, allowing V2V equipped vehicles (and mobile electronic devices receiving V2V messages) to record an accurate location of the curb. In this way, "curb maps" could be created easily, without the need for a government entity or third party to create and distribute such a database.

Note that the "once per second" transmission rate (or other predetermined rate) should have some dither imposed on the time interval, or at randomly selected initial transmission time (within the one second window), so that such elevation messages are spread out in time.

Note that vehicles may generate their own, internal, stored, set of non-grade-level crossings, in a minimal case, by observing that a number of vehicles appear (using surface of the earth locations) to be passing through each other without a collision.

A functioning V2V system requires at least two transponders. Because of proxying, such a V2V system using the transponders of these embodiments is effective with as little as 10% penetration. Penetration is the percent of vehicles in a defined region or class that are equipped. A "subject vehicle" is the vehicle whose data is in a message. The "host vehicle" is the vehicle in which the transponder is located. Proxying is when the subject vehicle is not the host vehicle.

For a first vehicle to proxy a second vehicle, the first vehicle must be able to determine, within accuracy thresholds, the second vehicle's position, heading and speed. These are generally determined relative to the first vehicle, and thus the core data in proxy messages may not have the same final accuracy as for non-proxy messages. Ideally, a single bit in the message header for Type 0 messages identifies if the message is a proxy message or not. For many purposes, a proxy message is processed within the V2V system nearly the same as for a non-proxy message, except that the sending transponder is not hosted by the subject vehicle. There is no limit to the number of vehicles a transponder may proxy.

Determination of relative position, speed and heading is typically accomplished with sensors such as cameras, sonar, radar and LIDAR, mounted on the same vehicle as the transponder. In many cases, such sensors are used for other purposes, such as backup warnings or self-park sensors. Often, a vehicle will be able to proxy a vehicle directly in front, behind, to the left, to the right, and often four or more "diagonal" vehicles that are line-of-sight. A vehicle in stopped first in line at a stop sign or traffic light may be able to proxy a large number of vehicles that are first or second in line at other points in the intersection, as well as most vehicles passing through the intersection. On two lane roads, a vehicle will often be able to proxy an oncoming vehicle.

In some cases, partial information may be available about a potential proxy vehicle. For example, for a high-speed oncoming vehicle it may be possible to determine heading and speed, and position relative to the cross road axis, quite accurately. However, position on the road axis may not be determinable to a desired accuracy. Nonetheless, it may be desirable to proxy the vehicle anyway, because a computed risk involving that vehicle exceeds a threshold.

During a proxy handoff, the new proxy transmitter may either use the same time slot or select a new one. Note that if the same time slot is used, it will be empty for one frame. Thus, if is often desirable to wait at least two frames before self-selecting an empty time slot, so that proxy handoffs may use the same time slot. A proxy handoff may occur in the same frame, if the new proxy transmitter selects a higher time slot that the previous proxy time slot.

The proxy transmitter should identify itself by sending a "proxy linking" message in the non-priority class region or in the priority class region. Such a message should be sent regularly, such as every 2 to 5 seconds. Failure to provide such a proxy linking message permits a form of hacking, which is sending invalid proxy messages. A proxy linking message may use two time slots number fields (two 12-bit fields). The total size of a proxy-linking message is thus the 6-bit Sub-message Type Code plus 24 bits, or 30 bits total.

Proxy messages may alternate or substitute periodically with the proxy transmitter's primary time slot; however this is not a preferred embodiment.

It is possible to proxy an equipped vehicle, if for some reason, the equipped vehicle's transmissions are not fully receivable, or in error. This may occur at a blind (radio-blind) corner, for example, or with a defective transponder.

A key embodiment is the method to "hand off" a proxy from one equipped vehicle to another. A first vehicle may proxy a second vehicle any time it is able to determine the position speed and heading of the second vehicle within required accuracy. However, if a third vehicle is already proxying the second vehicle, the first vehicle should not, generally, duplicate the proxy. However, if the first vehicle believes that it's information about the proxy is more accurate that the information being send by the third vehicle, it may begin proxying. This is an indication to the third vehicle that it may wish to stop proxying.

The simplest hand-off is for a first transponder to simply stop sending proxy messages for a second vehicle. Within one frame time, any third vehicle will detect that stopping and may start proxying the second vehicle, if qualified. If there is more than one qualified vehicle to proxy the second vehicle, generally the one that selects the lowest numbered time slot (in the priority class region) will continue to proxy, as that message will be heard by the other potential senders.

It is desirable that all vehicles in a range set have a common time base with a minimum amount of error. An internal clock or GPS-derived clock may not be adequate for this purpose. In one embodiment consensus is used to arrive at a (nearly) common time base for a consensus set. Each time slot message should begin at precisely the start of the time slots. Time-of-flight may be corrected because the transmitter's location is usually known. Thus, each receiver can compute the apparent time base error for all valid TDMA messages received. Each receiver may then average all such apparent time base errors, including its own "best" time base (which may be weighted to count as more than one in the averaging), and shift its "as transmitted" time base by that, consensus based error. Since each transponder includes its own reference time base (which may be a combination of GPS or other satellite system derived time base and a precision internal clock) in the averaging, the consensus time base will also converge towards the average of all internal time bases in the range set. Since ranges sets typically overlap, the time base error "as transmitted" by each vehicle is likely to be very slightly different. Invalid messages, and messages where the vehicle location or time-of-flight cannot be accurately determined are not used in the averaging process. Messages with an excessive amount of apparent time base error are considered invalid for this purpose. Ideally, the time base correction is performed at the end of every frame, although it may be performed on a different schedule, or only under certain conditions. Time base correction should limited to a maximum rate of change. A transponder without a sufficiently accurate internal clock should not transmit, although listening is typically still valuable. A suitable accuracy is in the range of 1 ns to 4 μs, with 0.250 μs being a good desired minimum accuracy. If the time base is going to be used to compute distance, then a desired accuracy is in the range of 0.1 to 2 ns, with 0.3 ns being a good choice.

The meaning of the term "message" includes "sub-message." A "consensus group" is a group of transponders participating in a convergent algorithm using the V2V messages of embodiments of this invention.

Suitable buffer zone sizes may be 10, 20, 50, 100, 125, 150, 200, 250, or 300 time slots. Suitable buffer zone sizes are 10%, 15%, 20%, 40%, 50%, 75%, 100%, or 200% of a current priority or emergency class region size. Buffer zone sizes may be a combination of a numerical time slot count and a percentage of an class region size, such as the larger of 50 time slots or 50% of current class region size, subject the limit of all time slots. Buffer zone size may be fixed or variable.

Embodiments and possible limitations include: A minimum number of time slots of 50, 100, 150, 200, 250, 500, 1000, 2000; A minimum number of time slots for vehicle safety messages comprising (i) vehicle position, (ii) vehicle speed, and (iii) vehicle heading are 15, 50, 100, 150, 200, 250, 500, 1000, or 2000; A minimum number of time slots for vehicle safety messages comprising (i) vehicle position, (ii) vehicle speed, (iii) vehicle heading, and (iv) vehicle identification suitable for V2V potential collision warnings are 15, 50, 100, 150, 200, 250, 500, 1000, or 2000; A minimum number of time slots for vehicle safety messages dedicated to being transmitted by a combination of emergency vehicles and government authorized road-side units are 10, 25, 50, 100, 150, 200, 250, or 500; A maximum time for the basic time interval is 2, 1, 0.5, 0.25, 0.1, 0.05, or 0.01 seconds; A minimum transmit rate for V2V safety messages or messages suitable for V2V potential collision warnings is 1, 2, 5, 7.5, 10, 15, or 20 times per second; A maximum message length for data, exclusive of: wireless header, preamble, signal field, frame check sum, and inter-frame guard time is 114 bits, 282 bits, 36 bytes, 50 bytes, 75 bytes, 100 bytes, 150 bytes, 200 bytes, 250 bytes; A maximum message length for data, exclusive of: wireless header, preamble, signal field, frame check sum, and inter-frame guard time but inclusive of any MAC or IPS address, if any, is 114 bits, 282 bits, 36 bytes, 50 bytes, 75 bytes, 100 bytes, 150 bytes, 200 bytes, 250 bytes; A maximum time of an inter-frame guard time of 1, 2, 3, 4, 5, 7.5 10, 15, 20, 25, 50 microseconds; An inter-frame guard time computed by maximum intended range of single-hop V2V communications divided by the speed of light, plus two times the allowable common time base error; A maximum intended range of single-hop V2V communications of 50, 100, 250, 500, 750, 1000, 1500, 2000, 2500, 5000, or 10000 meters; A minimum number of vehicles that may simultaneously use a V2V communications system with 90%, 95%, 99%, 99.5%, 99.9% or 99.99% reliability is 10, 25, 50, 75, 100, 150, 200, 250, 350, 500, 750, or 1000; A minimum number of time slots reserved for land vehicle use; A transceiver, for each subject vehicle, transmits a vehicle safety message or a V2V message suitable for collision prevention no more than once per basic time interval, in at least 90% of all basic time intervals; Each non-forwarded safety message comprising a subject vehicle position is unique for the basic time interval in which it is broadcast; Each safety message is updated for each basic time interval in which it is broadcast; Each safety message comprises data that is to be interpreted as valid precisely at the end of the basic time interval in which it is broadcast; V2V system incorporating transponders of this invention are free of road-side units (RSU's); V2V system incorporating transponders of this invention are free of the necessity for any fixed infrastructure, such as servers, cell towers, or RSUs; All time slots are available for use by mobile transponders. Such limitations or features of this paragraph may be in any combination. A preferred embodiment is a basic time interval of 0.1 seconds comprising 1000 time slots with an intended range of 1000 meters comprising V2V safety messages of 114 data bits and 282 data bits, supporting a minimum number of time slots reserved for a combination of emergency vehicle and government provided RSU use.

A functioning V2V system requires at least two transponders. Because of proxying, such a V2V system using the transponders of these embodiments is effective with as little as 10% penetration. Penetration is the percent of vehicles in a defined region or class that are equipped. A "subject vehicle" is the vehicle whose data is in a message. The "host vehicle" is the vehicle in which the transponder is located. Proxying is when the subject vehicle is not the host vehicle.

The embodiments and scenarios are described herein are non-limiting. As those trained in the art appreciate, there are many alternative and equivalent embodiments of this invention. Small variations from absolutes, constants, and limits, such as "all," "always," or "one," that have a minimal effect on the purpose of the invention, are within the scope of the claims. A "minimal effect" may be defined as one that reduces the desired effectiveness by 5% or less.

Applications to which this application claims priority are incorporated herein. The terms "position" and "location" may be used interchangeably. Embodiments of this invention include all possible combinations of all limitations, options, features, and ranges disclosed herein, including in the claims and drawings.

What is claimed is:

1. A vehicle-to-vehicle (V2V) communication transponder adapted to operate in a first vehicle equipped with the V2V transponder wherein the transponder is adapted to accept as input a subject vehicle position and a subject vehicle heading, and wherein the transponder is adapted to broadcast a series of V2V safety messages wherein each V2V safety message comprises: (i) the subject vehicle position; (ii) the subject vehicle heading; and (iii) a subject vehicle speed; wherein the improvement is:

the transponder uses a basic time interval ("frame") of predetermined duration wherein the frame repeats continuously;
wherein the frame comprises integer n time slots of predetermined duration, enumerated and contiguous;
wherein a length of the frame and the integer n have been previously agreed with other transponders;
wherein the frame is subdivided into a priority class region comprising contiguous time slots from a first time slot S1 to a last time slot S2; and
a non-priority class region comprising contiguous time slots from a first time slot S3 to a last time slot S4;
wherein the range S1 to S2 and the range S3 to S4 do not overlap;
wherein the transponder transmits only time-critical V2V safety messages in the priority class region;
wherein the transponder broadcasts a V2V safety message in one self-selected time slot in the priority class region in every frame;
wherein the V2V safety messages are broadcast in cleartext; and
wherein the only vehicle identification in at least some V2V safety messages is the subject vehicle position.

2. The vehicle-to-vehicle (V2V) communication transponder of claim 1 wherein:

the transponder message protocol in the non-priority class region is CSMA.

3. The vehicle-to-vehicle (V2V) communication transponder of claim 1 wherein:
the V2V safety messages are free of MAC addresses and free of IP addresses.

4. The vehicle-to-vehicle (V2V) communication transponder of claim 1 wherein:
the subject vehicle position consists of an offset in each of two axis from a point on a pre-defined geographical grid of points wherein the grid of points is defined on the surface of the earth.

5. The vehicle-to-vehicle (V2V) communication transponder of claim 4 wherein:
the predefined geographical grid of points comprises intersection points of latitude lines and longitude lines wherein the latitude lines are equally spaced in latitude degrees and the longitude lines are equally spaced in longitude degrees.

6. The vehicle-to-vehicle (V2V) communication transponder of claim 4 wherein:
the predefined geographical grid of points comprises intersection points of latitude lines and longitude lines wherein the latitude lines are equally spaced in one-half degrees latitude and the longitude lines are equally spaced in one-half degrees longitude.

7. The vehicle-to-vehicle (V2V) communication transponder of claim 4 wherein:
the two axes are North-South and East-West; and
wherein the offset is in units of distance.

8. The vehicle-to-vehicle (V2V) communication transponder of claim 1 wherein:
the transponder is adapted to broadcast a V2V elevation message comprising an elevation value, wherein the elevation value consists of an elevation offset from one of a predefined set of equally spaced elevations defined from a mean sea level.

9. The vehicle-to-vehicle (V2V) communication transponder of claim 1 wherein:
the transceiver is adapted to accept as input a relative location of a second, "non-equipped" vehicle;
wherein the relative location consists of a location in two axis relative to the location of the first vehicle ("equipped vehicle") comprising the transponder;
wherein the transceiver broadcasts a second series of V2V safety messages ("proxy messages") wherein each proxy message comprises: (i) a position of the non-equipped vehicle, (ii) a heading of the non-equipped vehicle, and (iii) a speed of the non-equipped vehicle;
wherein the transponder will initiate broadcasting proxy messages if: (i) the relative location of the non-equipped vehicle is determinable to within a threshold accuracy, and (ii) it has not received, within the most recent n frames, a proxy message for the non-equipped vehicle, wherein n is in the range of zero to ten.

10. The vehicle-to-vehicle (V2V) communication transponder of claim 9 wherein:
each proxy message comprises substantially the same format as the V2V safety messages broadcast by the transceiver with the exception of a proxy indicator within with proxy message identifying the message as s a proxy message.

11. The vehicle-to-vehicle (V2V) communication transponder of claim 10 wherein:
the proxy indicator comprises a value of a single bit.

12. The vehicle-to-vehicle (V2V) communication transponder of claim 9 wherein:
the transponder self-selects a time slot for broadcasting the proxy messages using the same method it uses for self-selecting a time slot for the V2V safety messages and wherein the self-selected time slot of proxy messages is not the same time slot for the V2V safety messages.

13. The vehicle-to-vehicle (V2V) communication transponder of claim 9 wherein: the transponder, once it has initiated broadcasting proxy messages for a non-equipped vehicle, continues to broadcast a proxy message, in each frame, for that non-equipped vehicle until either: (i) the relative location of the non-equipped vehicle is no longer determinable to within the threshold accuracy, or (ii) it has received, in most recently received frame, a proxy message for the non-equipped vehicle wherein an accuracy of the location of the non-equipped vehicle is more accurate than the determinable location by the transponder.

14. The vehicle-to-vehicle (V2V) communication transponder of claim 9 wherein:
n is one.

15. A vehicle-to-vehicle (V2V) communication system using a plurality of vehicles each equipped with a transponder of claim 1.

16. A vehicle equipped with the communications transponder of claim 1 wherein the subject vehicle is the equipped vehicle.

17. The vehicle-to-vehicle (V2V) communication transponder of claim 1 wherein the V2V safety messages are free of a permanently assigned vehicle ID.

18. The vehicle-to-vehicle (V2V) communication transponder of claim 1 wherein the V2V safety messages are free of a pre-assigned vehicle ID and are free of a pre-assigned transponder ID.

19. The vehicle-to-vehicle (V2V) communication transponder of claim 1 wherein at least a subset of S1, S2, S3 and S4 are determined dynamically.

20. The vehicle-to-vehicle (V2V) communication transponder of claim 1 wherein S2 is recomputed at the end of every frame.

* * * * *